United States Patent
Khare et al.

(10) Patent No.: US 9,083,611 B2
(45) Date of Patent: Jul. 14, 2015

(54) METHOD AND SYSTEM FOR VIRTUAL NETWORK INTERFACE CARDS (VNICS) OVER AGGREGATION SPANNING MULTIPLE SWITCHES

(71) Applicant: Oracle International Corporation, Redwood City, CA (US)

(72) Inventors: Shrikrishna Girish Khare, Sunnyvale, CA (US); Nicolas G. Droux, Rio Rancho, NM (US)

(73) Assignee: Oracle International Corporation, Redwood Shores, CA (US)

( * ) Notice: Subject to any disclaimer, the term of this patent is extended or adjusted under 35 U.S.C. 154(b) by 81 days.

(21) Appl. No.: 13/772,781

(22) Filed: Feb. 21, 2013

(65) Prior Publication Data
US 2014/0233370 A1    Aug. 21, 2014

(51) Int. Cl.
*H04L 12/24* (2006.01)
*H04L 12/709* (2013.01)

(52) U.S. Cl.
CPC ........ *H04L 41/0668* (2013.01); *H04L 41/0663* (2013.01); *H04L 45/245* (2013.01)

(58) Field of Classification Search
CPC ....... H04L 69/324; H04L 29/06; H04L 41/12; H04L 67/1097; H04L 67/1095; H04L 67/1008; H04L 67/1002; H04L 67/1017; G06F 17/30067
USPC .................................................. 370/208–356
See application file for complete search history.

(56) References Cited

U.S. PATENT DOCUMENTS

| | | | |
|---|---|---|---|
| 7,089,293 B2 * | 8/2006 | Grosner et al. | 709/217 |
| 7,313,614 B2 * | 12/2007 | Considine et al. | 709/223 |
| 7,486,678 B1 * | 2/2009 | Devanagondi et al. | 370/394 |
| 7,616,653 B1 * | 11/2009 | Droux et al. | 370/420 |
| 7,865,596 B2 * | 1/2011 | Grosner et al. | 709/226 |
| 7,958,199 B2 * | 6/2011 | Ferrari et al. | 709/211 |
| 8,331,362 B2 * | 12/2012 | Shukla et al. | 370/389 |
| 8,379,522 B2 * | 2/2013 | Wong et al. | 370/235 |
| 8,565,118 B2 * | 10/2013 | Shukla et al. | 370/254 |
| 8,588,224 B2 * | 11/2013 | Kamble et al. | 370/388 |
| 8,594,082 B2 * | 11/2013 | Kamble et al. | 370/388 |
| 8,660,129 B1 * | 2/2014 | Brendel et al. | 370/397 |
| 8,767,529 B2 * | 7/2014 | Kamath et al. | 370/218 |
| 8,767,722 B2 * | 7/2014 | Kamble et al. | 370/360 |

\* cited by examiner

*Primary Examiner* — Nicholas Sloms
(74) *Attorney, Agent, or Firm* — Osha • Liang LLP (57) ABSTRACT

A method for remapping VNICs associated with an aggregation layer. The method includes making a first determination that a first network interface card (NIC) has failed, where the first NIC and a second NIC are part of the aggregation group, the aggregation layer manages the aggregation group, where a first virtual NIC (VNIC) is mapped to the first NIC and a second VNIC is mapped to the second NIC, and the first NIC is connected to a first switch and the second NIC is connected to a second switch. The method further includes, based on the first determination, remapping the first VNIC to the second NIC, and after the remapping, receiving packets by the first VNIC from the second NIC.

9 Claims, 9 Drawing Sheets

METHOD AND SYSTEM FOR VIRTUAL NETWORK INTERFACE CARDS (VNICS) OVER AGGREGATION SPANNING MULTIPLE SWITCHES

BACKGROUND

Network traffic is transmitted from a network (e.g., a local area network (LAN), a wide-area network (WAN), the Internet, etc.), from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet of data. The payload contains the actual data to be transmitted from the network to the receiving system.

Some sending and receiving systems include a single NIC, while other sending and receiving systems include multiple NICs. When multiple NICs are present on the system, the system typically requires administrators to perform additional configuration during the initial setup of the system and when the system is modified in order to fully utilize the multiple NICs in the system. The aforementioned configuration may include both configuration of the NICs in the system as well as configuration of other components in the network that communicate the NICs.

SUMMARY

In general, in one aspect, the invention relates to a non-transitory computer readable medium comprising software instructions for managing resources on an aggregation layer, wherein the software instructions comprise functionality to: make a first determination that a first network interface card (NIC) has failed, wherein the first NIC and a second NIC are part of an aggregation group, wherein the aggregation layer manages the aggregation group, wherein a first virtual NIC (VNIC) is mapped to the first NIC and a second VNIC is mapped to the second NIC, and wherein the first NIC is connected to a first switch and the second NIC is connected to a second switch, based on the first determination, remap the first VNIC to the second NIC, and after the remapping, receive packets by the first VNIC from the second NIC.

In general, in one aspect, the invention relates to a system. The system includes a first network interface card (NIC) and a second NIC, wherein the first NIC and the second NIC are part of an aggregation group. The system further includes a host, operatively connected to the first NIC and the second NIC. Further, a first virtual NIC (VNIC) mapped to the first NIC, a second VNIC mapped to a second NIC, and where the first NIC is connected to a first switch and the second NIC is connected to a second switch. The system further includes an aggregation layer configured to manage the aggregation group, wherein managing the aggregation layer comprises remapping the first VNIC to the second NIC to the physical NIC after the first NIC has failed.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to managing incoming and outgoing network traffic on a host. More specifically, embodiments of the invention relate to using an aggregation layer in the host to aggregate multiple network interface cards (NICs) to transmit and receive packets.

Figure 1:
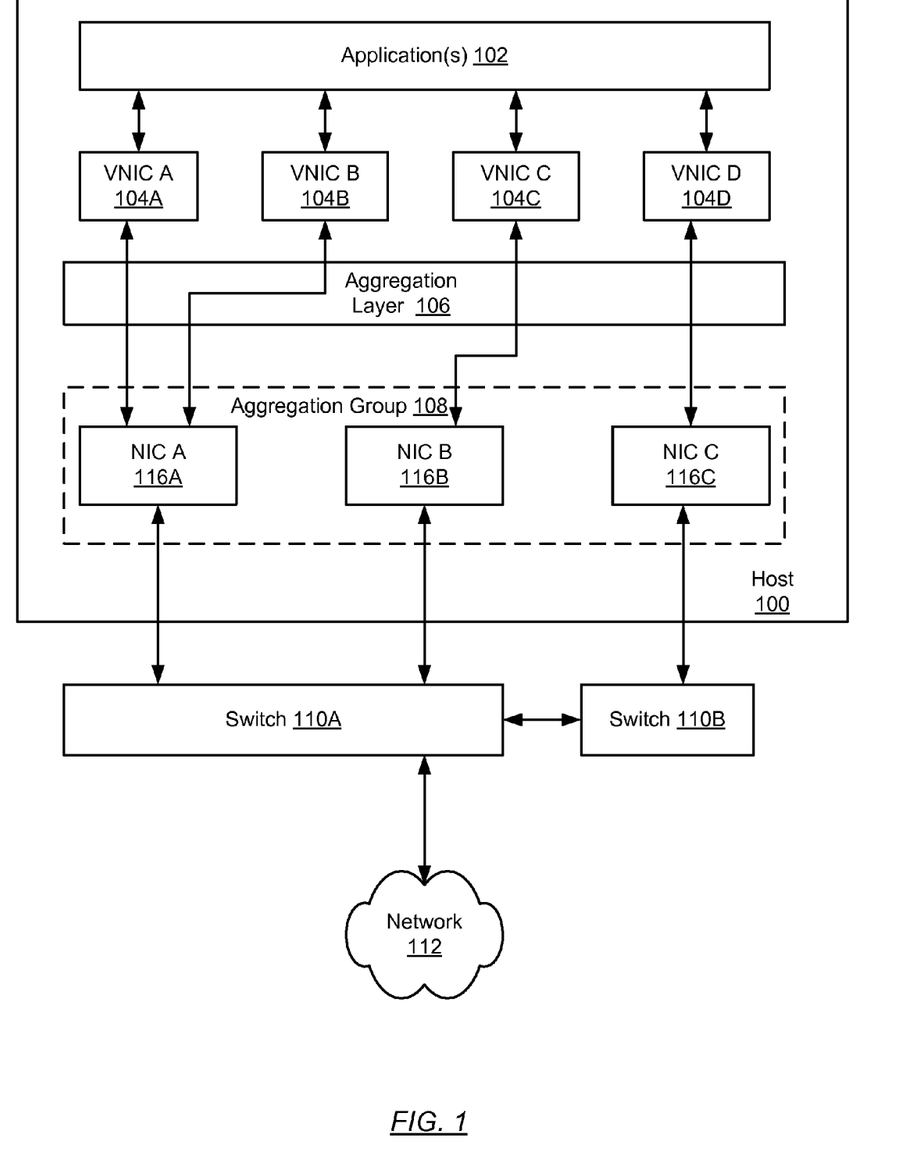
FIG. 1 shows a system in accordance with one or more embodiments of the invention.

FIG. 1 a schematic diagram of a system in one or more embodiments of the invention. As shown in FIG. 1, the system has several components including a host (100), switches (e.g., 110A,110B) and a network (112) in one or more embodiments of the invention. Each of these components is described below.

In one embodiment of the invention, the host (100) may include the following components: one or more applications (102), one or more VNICs (104A-104D), an aggregation layer (106), an aggregation group (108), and one or more virtual machines (VMs) (not shown). In one embodiment of the invention, an application (102) is a program or group of programs designed for end users. The application (102) may be divided into two general classes: systems software and applications software. Systems software consists of low-level programs that interact with the computer at a very basic level. Examples of systems software include, but are not limited to, operating systems, compilers, and utilities for managing computer resources. In contrast, applications software includes higher-level programs that execute on the systems software. Examples of systems software include, but are not limited to, virtual machines, database programs, word processors, and spreadsheets. In one or more embodiments of the invention, the applications (102) are configured to receive and transmit packets to/from the network (112) via one or more VNICs (104A-104D) and one or more NICs (116A-116C).

In one embodiment of the invention, a VNIC (104A-104D) is located within the media access control (MAC) layer of the host. The VNICs (104A-104D) provide an abstraction layer between physical NICs (116A-116C) and the various packet destinations (e.g., applications, VMs, etc.) on the host (100). More specifically, from the perspective of the various packet destinations, each VNIC (104A-104D) operates like a physical NIC. For example, in one embodiment of the invention, each VNIC (104A-104D) is associated with one or more MAC addresses, one or more Internet Protocol (IP) addresses, one or more ports, and configured to handle one or more protocol types. Thus, while the host (100) may be operatively connected to a single physical NIC, packet destinations and other applications on the host (100) operate as if the host (100) is bound to multiple physical NICs. In other words, each VNIC (104A-104D) operates like a separate network device connected to the network.

In one embodiment of the invention, if the packet destination is a VM, then the corresponding VNICs (104A-104D) is operatively connected to an interface. In one embodiment of the invention, interface includes functionality to forward packets to the corresponding VM and to receive packets from the corresponding VM. Further, the interface includes functionality to enable the VMs to communicate with the host (100) upon which they are executing. In one embodiment of the invention, each VM is associated with a VNIC (104A-104D).

In one embodiment of the invention, the host OS (not shown) is configured to provide functionality to create virtual execution environments (e.g., virtual machines) in which the guest OSs may execute. Further, the host OS may include functionality to manage the aforementioned virtual environments. The virtual environments may be provided using well known techniques in the art. An example of virtual execution environment is a Solaris™ Container. In such cases, the Solaris™ Container may execute in the host OS, which may be a Solaris™ OS. Solaris™ is a trademark of Oracle America, Inc. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual execution environments.

In one embodiment of the invention, each virtual execution environment includes functionality to execute an operating system (i.e., a guest OS). Further, each virtual execution environment may be isolated such that processes within a virtual execution environment may not communicate with other processes in other virtual execution environments. In addition, each virtual execution environment may be associated with a portion of the total hardware and processing resources of the host. In one embodiment of the invention, the host OS may include the functionality to send messages to, and receive messages from, elements within each of the virtual execution environments, including the guest OSs. In one or more embodiments of the invention, VNICs appear as physical NICs to the VMs. In one embodiment of the invention, the VMs include functionality to communicate with other elements within the host (100).

Returning to FIG. 1, in one embodiment of the invention, an aggregation layer (106) includes functionality to map a VNIC to a NIC. More specifically, the aggregation layer enforces a 1:1 mapping between VNICs and NICs but allows for an 1:n mapping between NICs and VNICs. Said another way, the aggregation layer allows a single NIC to be concurrently associated with multiple VNICs while the aggregation layer limits each VNIC to be concurrently associated with only one NIC. In one embodiment of the invention, the aggregation layer is implemented in the Media Access Control (MAC) layer of the host. In one embodiment of the invention, the aggregation layer is configured to manage NICs in an aggregation group, where the NICs in the aggregation group are connected to different switches. Further, the aggregation layer is configured to implement the process shown in FIG. 4. The aggregation layer may include functionality to monitor (directly or indirectly) the load on the NICs in the aggregation group and use this information to trigger a redistribution of the VNICs to NICs. Alternatively, the aggregation layer may obtain the aforementioned information based from another component in the system.

In one embodiment of the invention, an aggregation group corresponds to a logical group of physical network interface cards (NICs) (116A-116C). While the aggregation group includes multiple NICs, the aggregation layer does not load balance packets receipt and transmission or individual connections across the aggregation group; rather, the aggregation layer is configured to balance the number of VNICs associated with each NIC. The association of a VNIC to a NIC may be based on a number of factors including, but not limited to, packets received and transmitted via the VNIC, number of VNICs executing on the host, and the number of NICs executing on the host.

Further, the aggregation group may also include a virtual aggregated NIC that supports link aggregation, for example, as shown in U.S. Pat. No. 7,616,653, which is incorporated by reference in its entirety. Specifically, the virtual aggregated NIC would be part of the aggregation group and be presented to the aggregation layer and VNICs as a NIC; however, the virtual aggregated NIC is a software construct that is itself associated with a set of physical NICs. In such cases, the virtual aggregated NIC would operate like any other NIC in the aggregation group from the perspective of the aggregation layer and VNICs. However, packets received by the virtual aggregation NIC from the associated VNICs are spread across the NICs associated with the virtual aggregation NIC as described in U.S. Pat. No. 7,616,653.

In one embodiment of the invention, each physical NIC (116A-116C) provides an interface between the host (100) and a network (112) (e.g., a local area network, a wide area network, a wireless network, etc.). The physical NIC (116A-116C) may include a network interface (NI) and a classifier. In one embodiment of the invention, the NI refers to the hardware used to interface with the network and may correspond to an RJ-45 connector, a wireless antenna, etc. The packets received by the NI are then forwarded to other components on the physical NIC (116A-116C) for processing, etc. Those skilled in the art will appreciate that while the NI described above as being part of the physical NIC (116A-116C), the NI may be implemented using other hardware configurations (i.e., in hardware other than a "card"). In one embodiment of the invention, the classifier (not shown) may be implemented entirely in hardware (i.e., the classifier may be a separate microprocessor embedded on the physical NIC (116A-116C)). Alternatively, the classifier may be implemented in software stored in memory (e.g., firmware, etc.) on the physical NIC (116A-116C) and executed by a microprocessor on the physical NIC (116A-116C).

In one embodiment of the invention, the classifier is configured to analyze the incoming network traffic, typically in the form of packets, received from the network (112), via the switch (110A-110B). More specifically, the classifier is programmed to identify packets for the various packet destination and then notify the NIC to transmit such packets to the appropriate VNICs.

Continuing with the discussion of FIG. 1, in one embodiment of the invention, the switch (110A-110B) includes a switch table, functionality to populate the switch table, and functionality to forward packets received on any of the ports of the switch to another port of the switch using the switch table. The switch table includes entries that, for example, relate destination MAC address and port. Accordingly, when a packet is received by the switch, its destination MAC address is obtained and used to determine the port on which to forward the packet.

In one embodiment of the invention, the switch (110A, 110B) may be connected to one or more other switches and/or one or more NICs (116A-116C).

Figure 2:
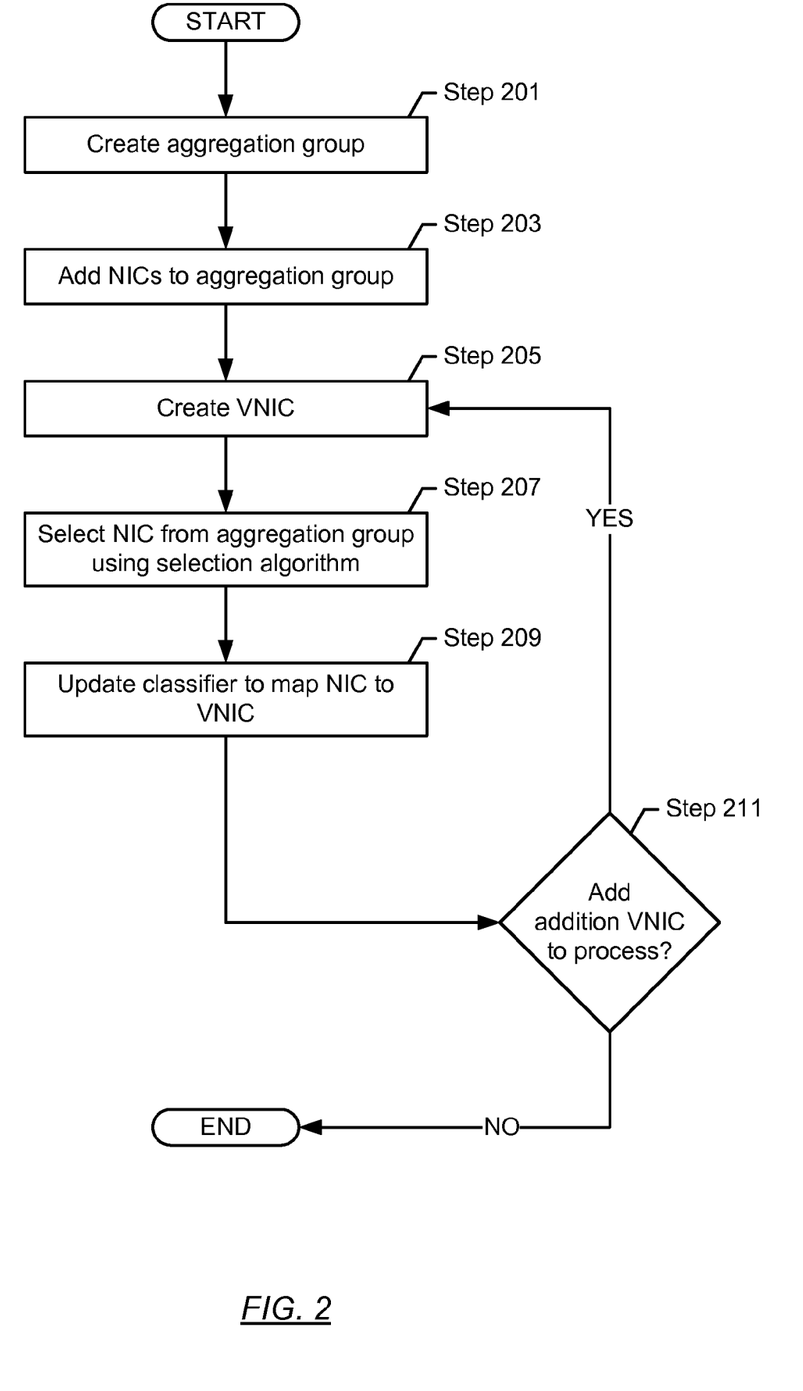
FIG. 2 shows a setup flowchart in accordance with one or more embodiments of the invention.
Figure 3A:
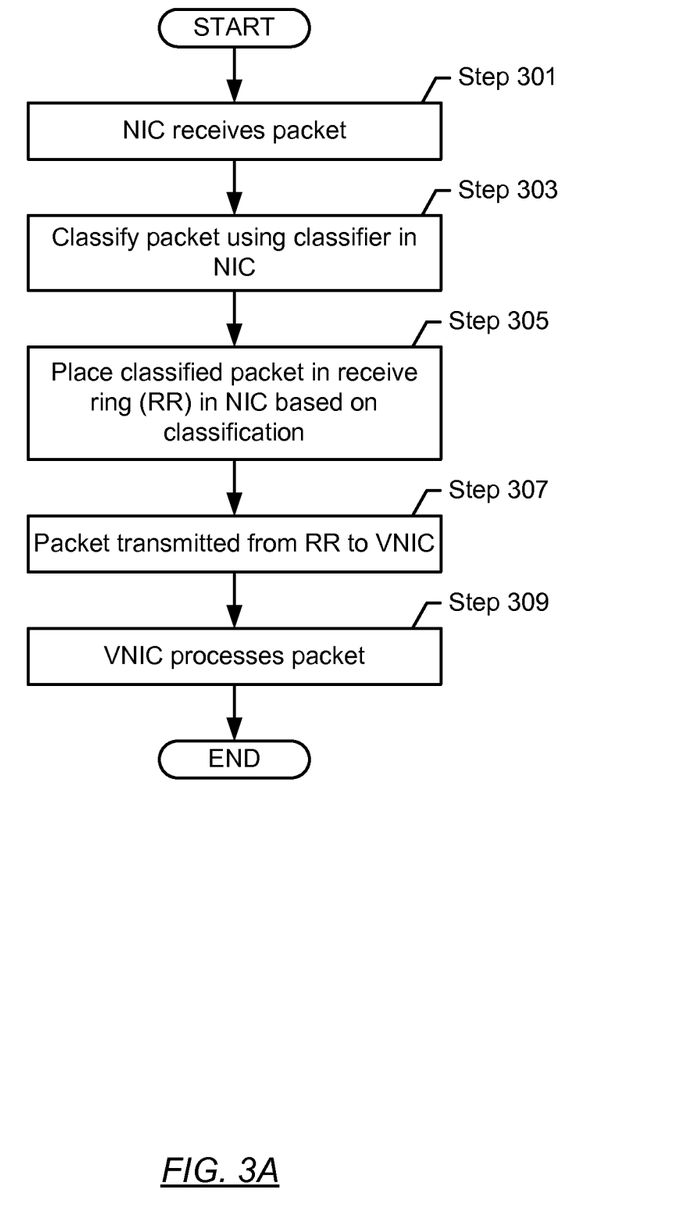
FIG. 3A shows a flowchart directed to in-bound packet processing in accordance with one or more embodiments of the invention.
Figure 3B:
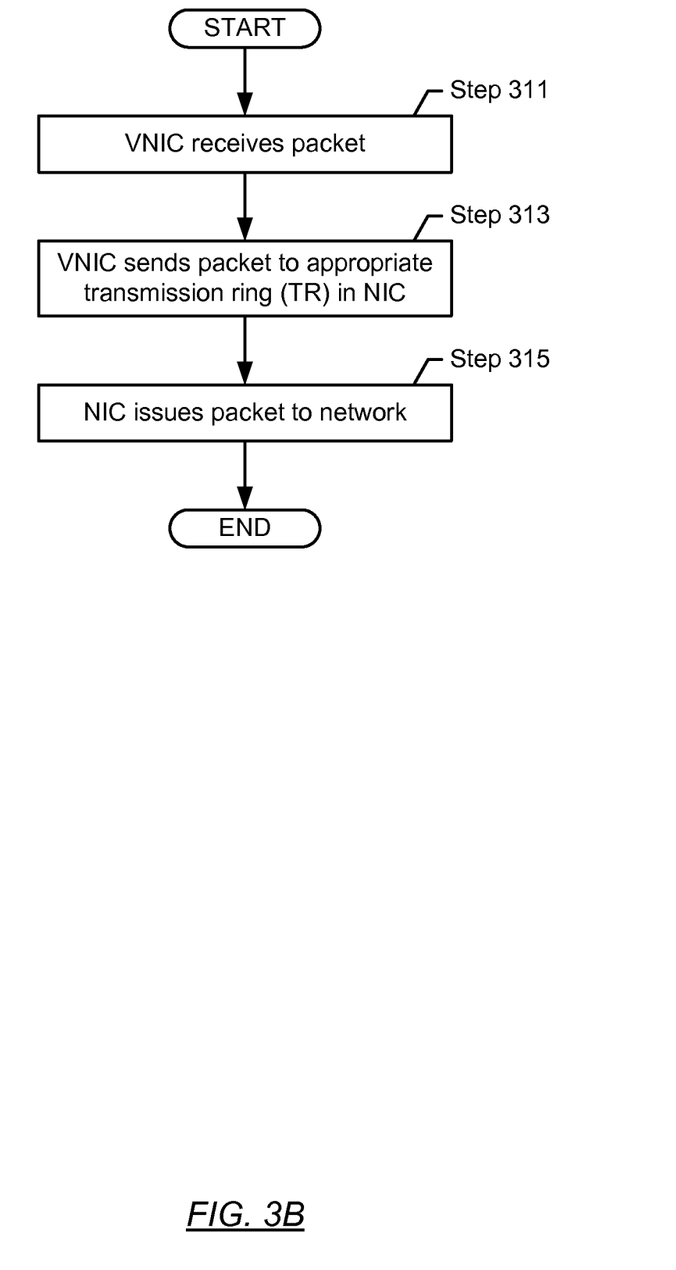
FIG. 3B shows a flowchart directed to out-bound packet processing in accordance with one or more embodiments of the invention.
Figure 4:
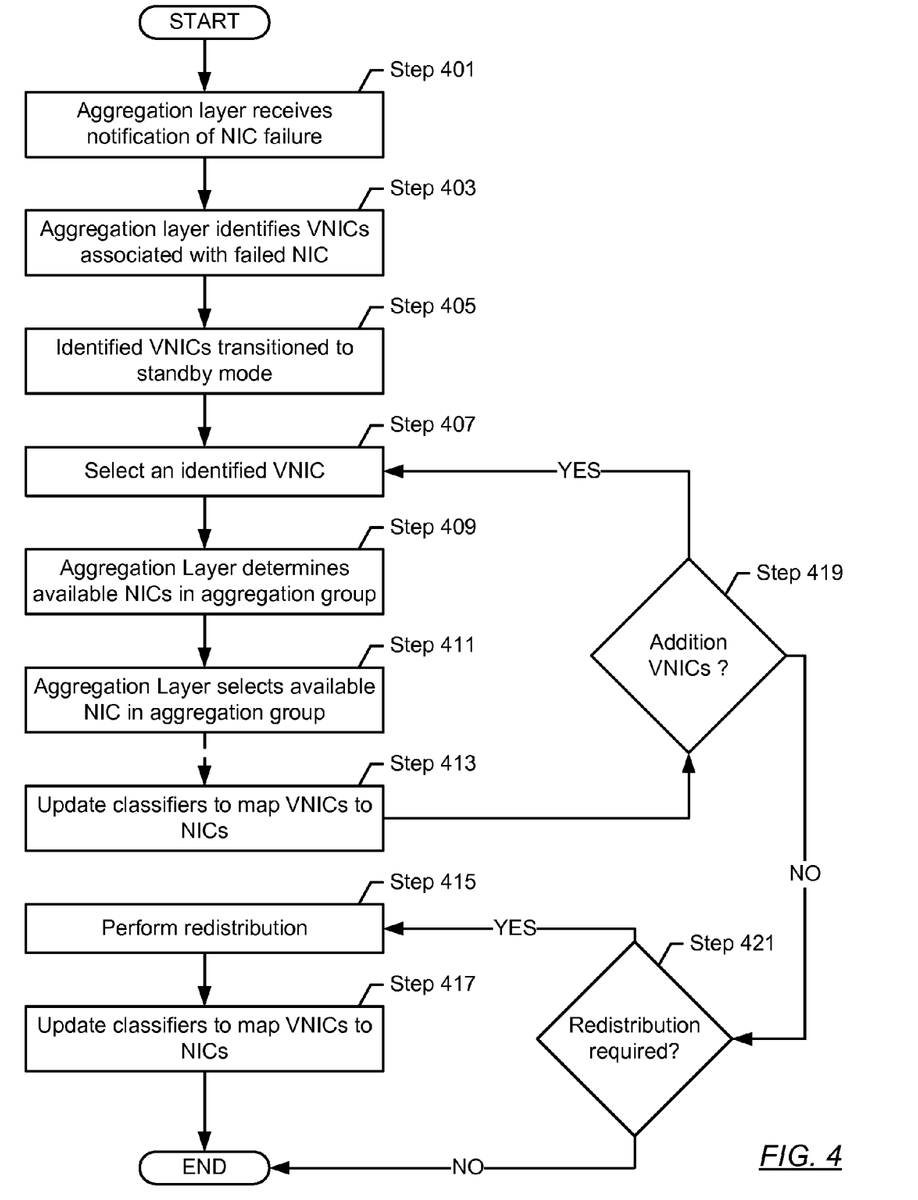
FIG. 4 shows a flowchart for redistributing VNICs by an aggregation layer in accordance with one or more embodiments of the invention.

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, steps such as determination steps may or may not require an actual operation to be performed. In addition, one or more of the steps shown in FIGS. 2-4 may be performed in parallel.

FIG. 2 shows a setup flowchart in accordance with one embodiment of the invention. In Step 201, an aggregation group is created. In one embodiment of the invention, creating an aggregation group may include creating the data structures necessary to track the NICs that are part of the aggregation group. In Step 203, one or more NICs are added to the aggregation group. While the membership of the aggregation group may change over time, the NICs specified in Step 203 correspond to the initial NICs that are part of the aggregation group. In Step 205, a VNIC is created. Creating a VNIC may include generating the data structures and/or initiating the processes necessary to implement the VNIC on the host as well as assigning an IP address and/or a MAC address to the VNIC. In Step 207, a NIC is selected from aggregation group using a selection algorithm. In one embodiment of the invention, the selection algorithm may correspond to any algorithm used to select a NIC from the aggregation group. For example, the selection algorithm may select a NIC based on, but not limited to, packets received and transmitted via the VNIC, number of VNICs executing on the host, and the number of NICs executing on the host In Step 209, the classifier in the NIC (selected in Step 207) is updated to map the NIC to the VNIC (created in Step 205). In Step 211, a determination is made about whether additional VNICs are to be created on the host. If additional VNICs are to be created on the host, the process proceeds to Step 205; otherwise the process ends.

FIG. 3A shows a flowchart for receiving inbound traffic (e.g., packets) by a NIC configured in accordance with one or more embodiments of the invention. In Step 301, a NIC receives a packet. The packet may be received from a switch, another network device, or directly from the network. In Step 303, the packet is classified using a classifier in the NIC. In Step 305, the classified packet is placed in a receive ring (RR) in the NIC based on the classification. Specifically, the packet is placed in an RR corresponding to a VNIC based on the classification. In Step 307, if the RR is associated with multiple VNICs, then a subsequent classification step may be performed in which the specific VNIC for which the packet is destined is identified. The subsequent classification may be performed using the destination MAC address in the packet. Once the specific VNIC is identified (regardless of whether the RR is associated with one or more VNICS), the packet is transmitted to the VNIC. The transmission of the packet may be performed using either a push or pull mechanism. In Step 309, the VNIC processes the packet. Processing the packet may include performing the appropriate layer 2, layer 3, and/or layer 4 network processing. Further, once the VNIC has processed the packet, the packet (or its payload) is provided to the packet destination.

FIG. 3B shows a flowchart for receiving outbound traffic (e.g., packets) by a VNIC configured in accordance with one or more embodiments of the invention. In Step 311, a VNIC receives a packet. The packet is typically received from an application (e.g., a systems software or applications software) executing on the host. In Step 313, the VNIC sends the packet to the appropriate transmission ring (TR) in the NIC, where the NIC has been previously associated with the VNIC via the process in FIG. 2 or FIG. 4. In Step 315, the NIC issues the packet to the network.

FIG. 4 shows a flowchart for redistributing VNICs by an aggregation layer in accordance with one or more embodiments of the invention. In Step 401, the aggregation layer receives a notification of NIC failure. In Step 403, the aggregation layer identifies VNICs associated with the failed NIC. In one embodiment of the invention, this information is obtained from the aggregation layer and/or data structure populated directly or indirectly by the aggregation layer (or a related process). In Step 405, the identified VNICs are transitioned to standby mode. While in standby mode, the VNICs do not receive or transmit packets. In Step 407, an identified VNIC is selected (i.e., a VNIC from the set of VNICs identified in Step 403). In Step 409, the aggregation layer determines available NICs in the aggregation group. In one embodiment of the invention, an available NIC may be any NIC that is currently able to receive and transmit packets. Alternatively, an available NIC may be any NIC that is currently not operating at its maximum bandwidth. Other parameters may be used to identify available NICs without departing from the invention.

In Step 411, the aggregation layer selects an available NIC in the aggregation group. The selection may be performed using the selection algorithm discussed above. In Step 413, the classifier in the NIC selected in Step 411 is updated to include an entry mapping the VNIC (selected in step 407) to the NIC. In Step 419, a determination is made about whether additional VNICs need to be mapped to NICs. If additional VNICs need to be mapped to NICs, the process proceeds to Step 407. Otherwise, the process proceeds to Step 421.

In Step 421, if the aggregation layer has not identified additional VNICs, then the aggregation layer determines if redistribution is required. For example, if the process in Steps 407-413 result in an uneven distribution (for example, based on bandwidth utilization) of VNICs to available NICs then the VNICs may need to be redistributed across the NICs in the aggregation group. If redistribution is not required, the process ends.

If redistribution is required, then in Step 415, the redistribution is performed. Redistribution may include setting all or a portion of the VNICs associated with the aggregation layer in standby mode and remapping each VNIC to an available NIC in the aggregation group. In Step 417, the classifiers are updated to map VNICs to NICs based on the redistribution performed in Step 415. Once the redistribution is complete, the VNICs may resume normal operation. Those skilled in the art will appreciate that steps 415, 417, and 421 may not be performed; rather, the processing described in step 411 ensures that once all the identified VNICs in step 405 are remapping to an active NIC, that no subsequent redistribution is immediately required.

Figure 5A:
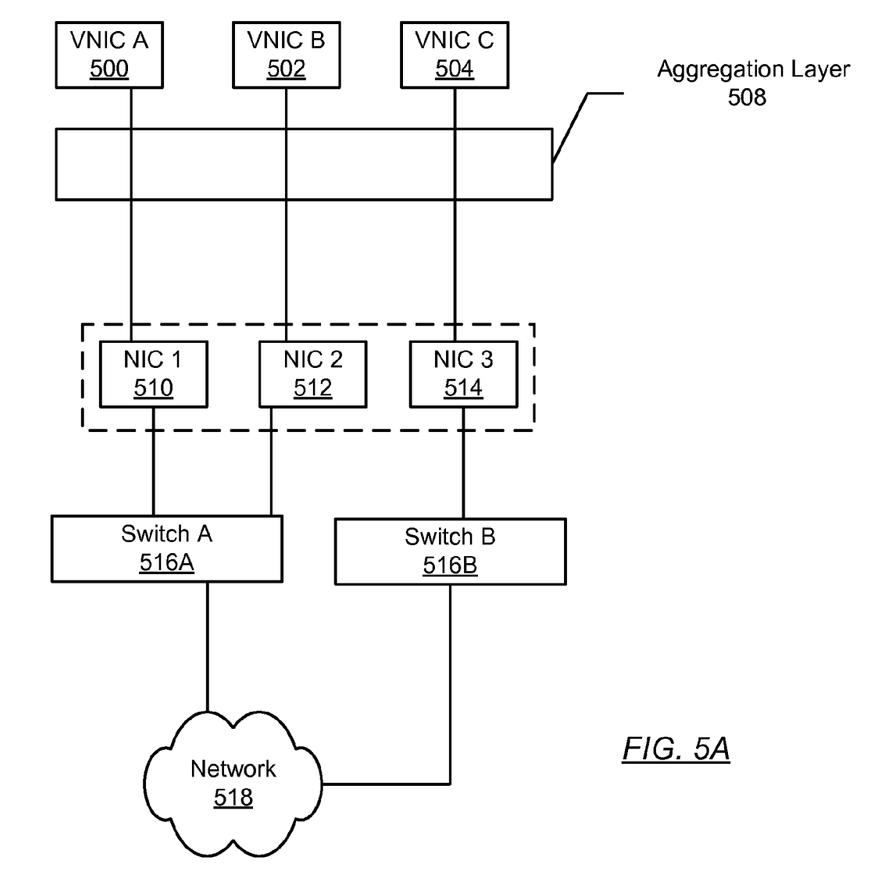
FIGS. 5A-5C show an example in accordance with one or more embodiments of the invention.
Figure 5B:
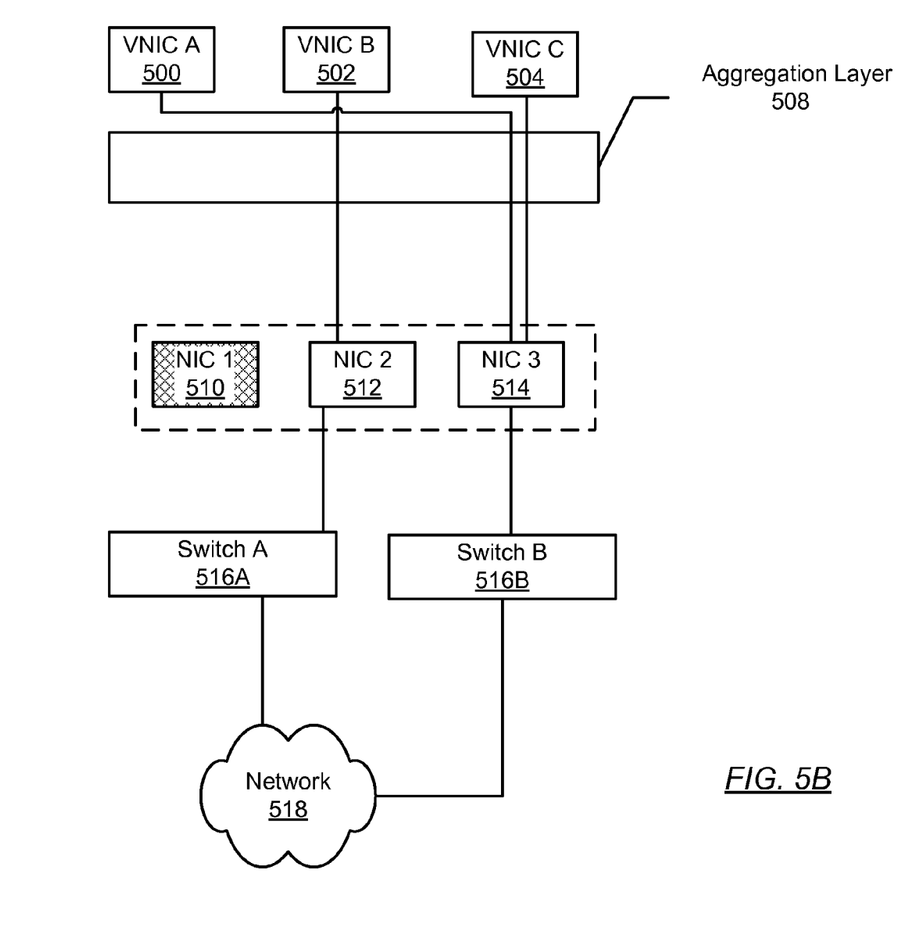
Figure 5C:
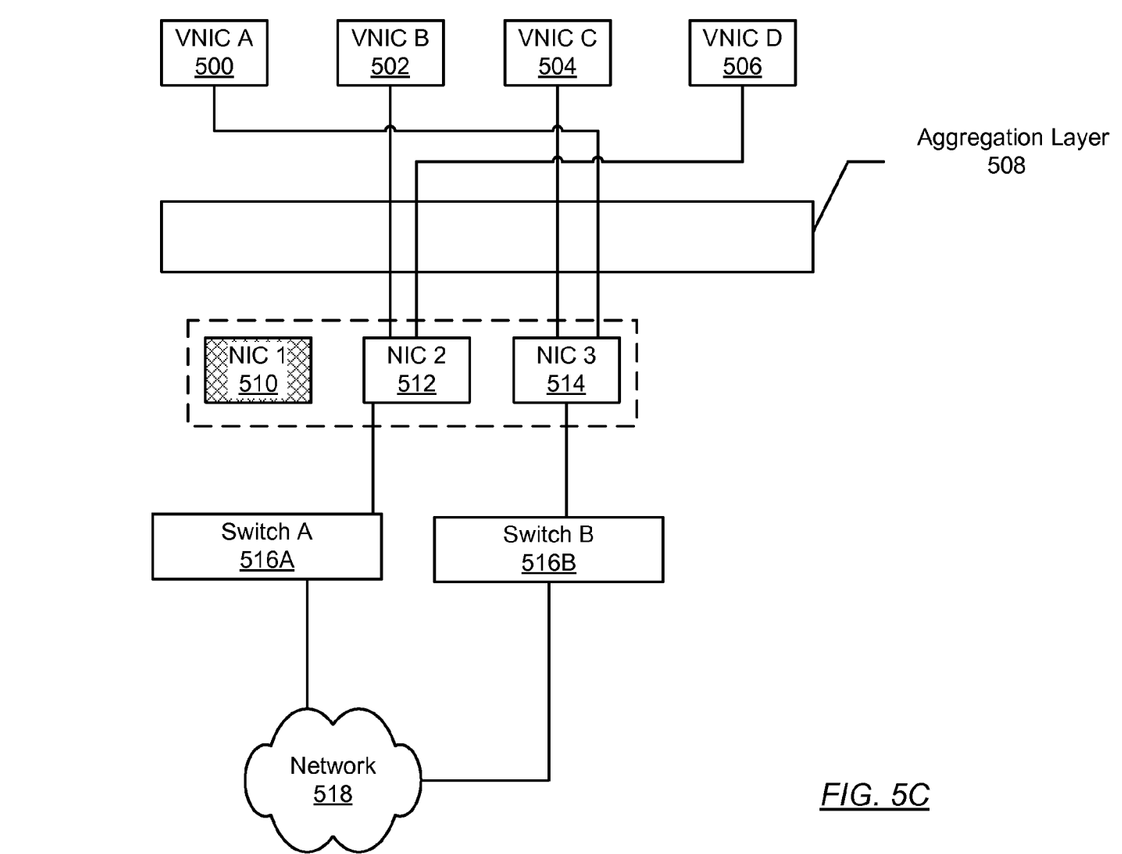

FIGS. 5A-5C show examples in accordance with one embodiment of the invention. The exemplary system is not intended to limit the scope of the invention. Further, some elements unnecessary for the purposes of the exemplary figures may have been omitted.

As depicted in FIG. 5A, the exemplary system includes three VNICs: VNIC A (500), VNIC B (502), and VNIC C (504). The VNICs (500, 502, 504) are operatively connected through an aggregation layer (508) to an aggregation group, which includes three NICs: NIC 1 (510), NIC 2 (512), and NIC 3 (514). The NICs are connected to the switch (516), which is in turn connected to a network (518).

As shown in FIG. 5A, each of the VNICs is mapped to a separate NIC. As discussed above, the mapping is determined by the aggregation layer and subsequently implemented by the classifiers in the respective NICs. Depending on the implementation, the aggregation layer may also include functionality to process outbound packets received from the VNICs and transmit them to the appropriate NICs.

Turning to FIG. 5B, consider a scenario in which NIC 1 (510) has been removed or has failed. Then, in accordance with one or more embodiments of the invention, the associated VNICs are identified, specifically VNIC A (500) in this example. The aggregation layer may subsequently determine which NICs in the aggregation group are available. In this example, NICs 2 and 3 are available. Based on a selection algorithm implemented by the aggregation layer, NIC 3 may be selected to be mapped to VNIC A. Once the selection is made, the classifier in NIC 3 is updated to include at least one entry for VNIC A. More specifically, the classifier may include an entry that specifies one or more of a layer 2 address, a layer 3 address, and a layer 4 address, where the aforementioned addresses are associated or otherwise identify VNIC A. Accordingly, when a packet is received by the classifier that includes one or more of the aforementioned addresses, the packet is placed in a receive ring in the NIC that is associated with VNIC A. VNIC A may subsequently obtain the packet by polling the receive ring and/or VNIC A may be notified that the receive ring includes a packet via an interrupt issued by NIC 3.

Continuing with the example, if a particular NIC recovers or is newly added to the aggregation group or if a VNIC is added or removed from the system, then one or more of the VNIC to NIC mappings may be redistributed across the NICs in the aggregation group. For example, as shown in FIG. 5C, VNIC D (506) is added to the system. At this stage, the aggregation layer may attempt to evenly redistribute the VNICs to spread the load evenly across all NICs in the aggregation group. FIG. 5C shows the state of the system after VNIC D is mapped to NIC 2.

Those skilled in the art will appreciate that while the aggregation group may be connected to multiple switches, no switch side configuration is necessary to achieve high availability (HA) across multiple switches. More specifically, embodiments of the invention enable the aggregation layer to configure and redistribute VNICs on the system to available NICs in the system without requiring any reconfiguration of information on the switches that are connected the NICs. In this manner, embodiments of the invention enable the use of NICs in an aggregation group that spans multiple switches, without requiring configuration of the switches when a VNIC is initially mapped to a NIC connected to a first switch and then subsequently mapped to a NIC that is connected to a second switch. Further, in one or more embodiments of the invention, the aggregation layer enables network traffic from the host to be spread across multiple switches without requiring any switch side configuration. Rather, the load balancing of network traffic to the switches is managed by the aggregation layer on the host.

Figure 6:
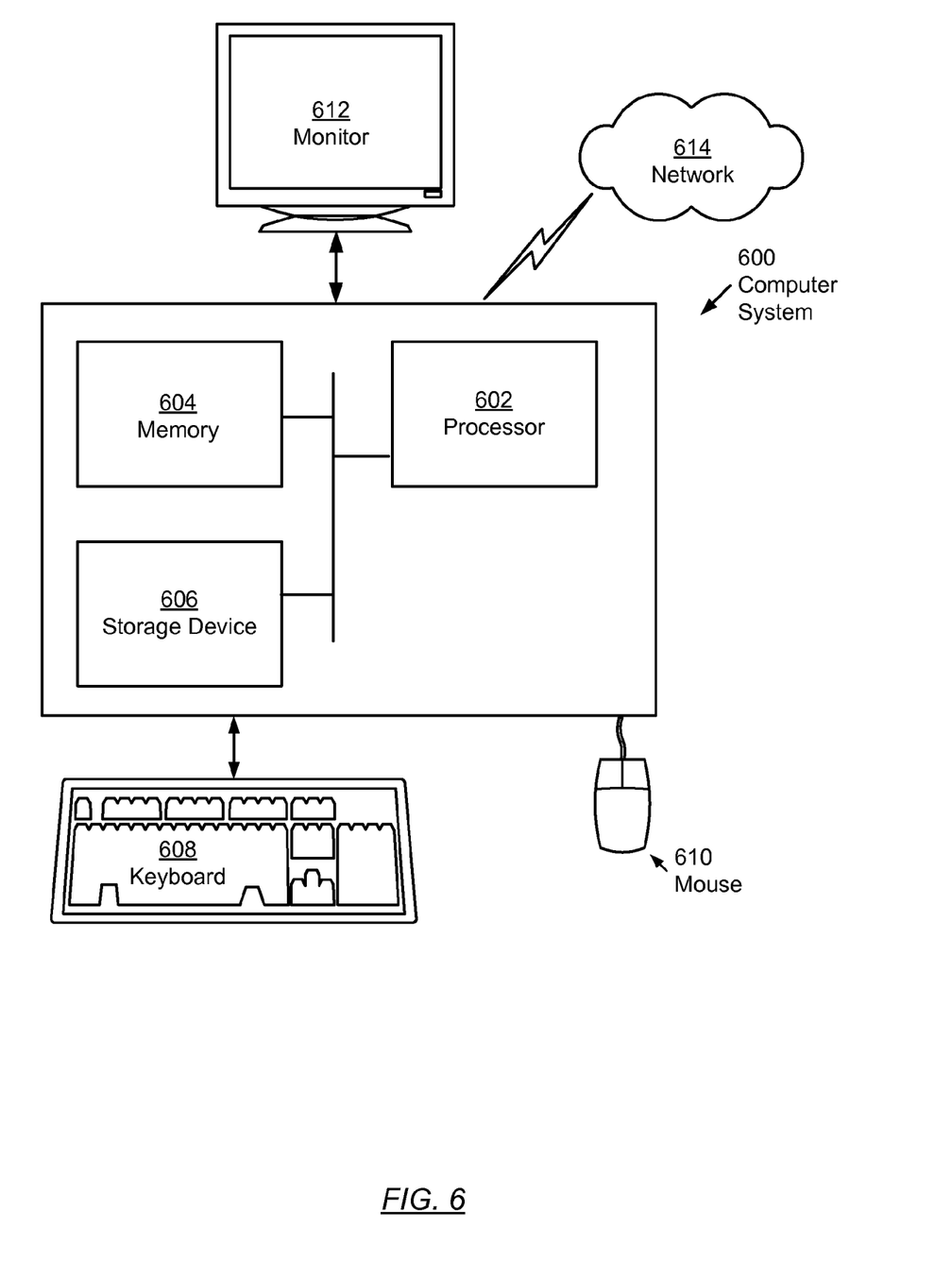
FIG. 6 shows a computer system in accordance with one or more embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network (614) via multiple NICs (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a non-transitory computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A non-transitory computer readable medium comprising software instructions for managing resources on an aggregation layer which, when executed by a processor of a host, cause the processor to:
    make a first determination, by the aggregation layer, that a first network interface card (NIC) has failed, wherein the first NIC and a second NIC are part of an aggregation group, wherein the aggregation layer executes on the host, wherein the aggregation layer manages the aggregation group, wherein a first virtual NIC (VNIC) is mapped to the first NIC and a second VNIC is mapped to the second NIC, and wherein the first NIC is connected to a first switch and the second NIC is connected to a second switch;
    based on the first determination, remap the first VNIC to the second NIC;
    after the remapping, receive, by the first VNIC, packets from the second NIC;
    make a second determination that a third NIC is added to the aggregation group; and
    based on the second determination, redistribute the first VNIC and the second VNIC across the second NIC and the third NIC.

2. The non-transitory computer readable medium of claim 1, wherein a third VNIC is mapped to the second NIC.

3. The non-transitory computer readable medium of claim 1, wherein the first VNIC, the second VNIC, and the aggregation layer are located in a media access control (MAC) layer of the host.

4. The non-transitory computer readable medium of claim 1, wherein the aggregation layer remaps the first VNIC to the second NIC.

5. The non-transitory computer readable medium of claim 1, wherein the aggregation layer is configured to evenly distribute VNICs across active NICs in the aggregation group.

6. The non-transitory computer readable medium of claim 1, wherein the aggregation group comprises a virtual aggregated NIC.

7. A system comprising:
   a first network interface card (NIC) operatively connected to a first switch;
   a second NIC operatively connected to a second switch;
   a third NIC operatively connected to a third switch,
      wherein the first NIC, and the second NIC are part of an aggregation group, and
      wherein the third NIC is added to the aggregation group after the first NIC and the second NIC; and
   a host, operatively connected to the first NIC, the second NIC, and the third NIC, comprising:
      a first virtual NIC (VNIC) mapped to the first NIC,
      a second VNIC mapped to the second NIC,
      an aggregation layer configured to manage the aggregation group, wherein managing the aggregation group comprises remapping the first VNIC to the second NIC after determining that the first NIC has failed; and redistributing the mapping of the first VNIC and the second VNIC across the second NIC and the third NIC after the third NIC is added to the aggregation group.

8. The system of claim 7, wherein the first switch and the third switch are the same switch.

9. The system of claim 7, wherein the aggregation layer is located in a media access control (MAC) layer on the host and wherein the first NIC and the second NIC are connected to a physical layer on the host.

* * * * *

UNITED STATES PATENT AND TRADEMARK OFFICE
CERTIFICATE OF CORRECTION

PATENT NO. : 9,083,611 B2  
APPLICATION NO. : 13/772781  
DATED : July 14, 2015  
INVENTOR(S) : Khare et al.

Page 1 of 1

It is certified that error appears in the above-identified patent and that said Letters Patent is hereby corrected as shown below:

IN THE SPECIFICATION

In column 2, line 52, delete "110A,110B)" and insert -- 110A, 110B) --, therefor.

IN THE CLAIMS

In column 9, line 12, in Claim 7, delete "switch:" and insert -- switch; --, therefor.

Signed and Sealed this  
First Day of March, 2016

Michelle K. Lee  
*Director of the United States Patent and Trademark Office*